March 18, 1924.
J. E. PULLIAM
WAREHOUSE TRUCK
Filed June 17, 1921
1,487,263
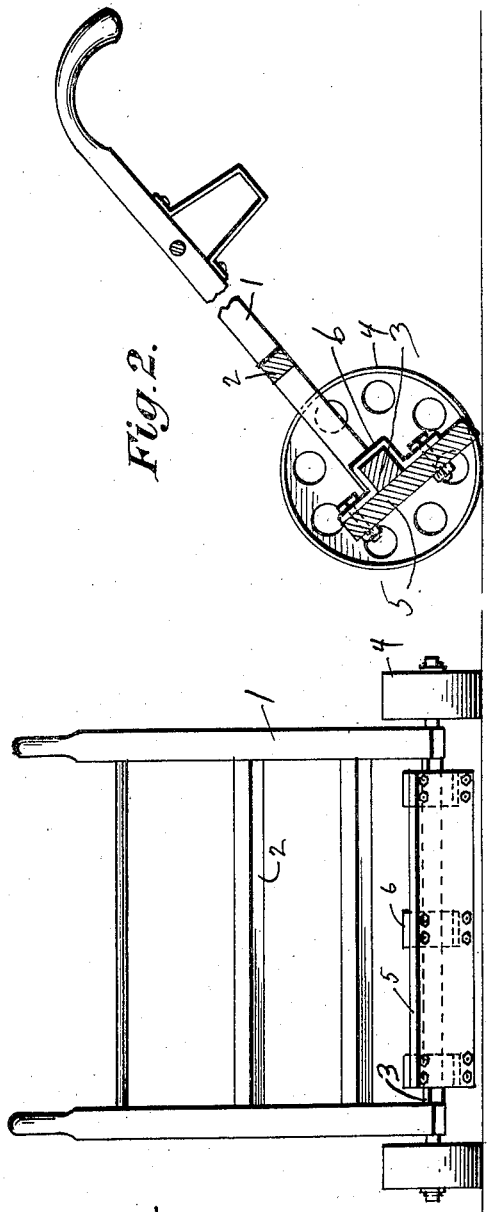
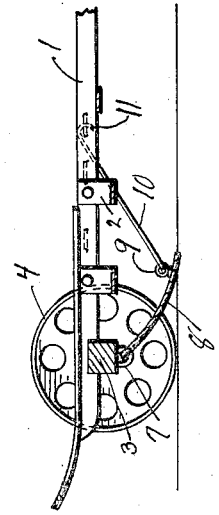
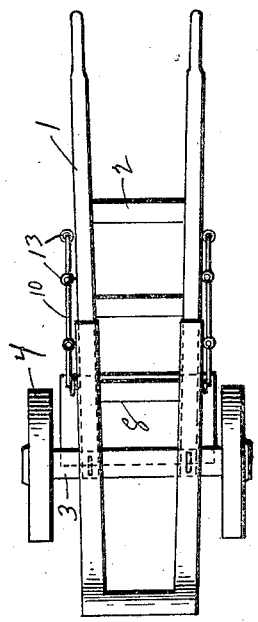
J. E. Pulliam, INVENTOR.
BY
ATTORNEY.

Patented Mar. 18, 1924.

1,487,263

UNITED STATES PATENT OFFICE.

JAMES EDWARD PULLIAM, OF NEW YORK, N. Y.

WAREHOUSE TRUCK.

Application filed June 17, 1921. Serial No. 478,360.

*To all whom it may concern:*

Be it known that I, JAMES E. PULLIAM, a citizen of the United States, residing at New York, in the county of New York and State of New York, have invented certain new and useful Improvements in Warehouse Trucks, of which the following is a specification.

This invention relates to improvements in warehouse trucks for moving bales, barrels, bags, boxes and other commodities and especially with reference to the provision of a braking mechanism which will be easily operated in conjunction with the truck.

In the drawing:—

Figure 1 is a rear elevation of a truck showing one form of brake attached thereto, Figure 2 is a sectional view of the modification shown in Figure 1, Figure 3 is a top plan view of a modified form, and Figure 4 is a fragmentary sectional view thereof.

Referring to the drawing in detail it will be seen that the truck illustrated is of conventional form and is provided with the usual handle bars 1 which are connected by means of the cross pieces 2. An axle 3 is suitably carried at the bottom ends of the handle bars 1 so as to be supported in the wheels 4. A beam 5 is attached to the axle 3 by means of the straps 6 and the width of this beam 5 is such so that one edge of the beam will extend beyond the periphery of the wheels 4. It will also be noted that the beam 5 is positioned at right angles to the handle bars 1 and when these bars are extended at an angle of approximately forty five degrees from the ground this extended edge of the beam 5 will not engage the ground. As soon as the handle portions of the handle bars 1 are lowered this beam 5, however, will engage the ground thereby efficiently breaking the truck.

In the modification shown in Figures 3 and 4 the truck is of the same conventional construction and is provided upon its axle 3 with a plurality of eye-bolts 7 which engage apertures in the beam 8. This beam 8 is preferably curved transversely as shown to advantage in Figure 4 and eye bolts 9 are fixed thereto for supporting one of the ends of the rods 10 which at their other ends are provided with hooks 11 which are adapted to engage the eye bolts 13 arranged in spaced relation to each other along the outer sides of the handle bars 1. Thus the angle at which the braking beam 8 is disposed in relation to the handle 1 may be changed by placing the hooks 11 of the rods 10 in the various eye bolts 13 as will be readily understood.

The above description represents and describes the preferred construction of my brake as disclosed in the drawing but it will be understood that numerous changes in form, proportion, and in the combination of parts may be made without departing from the scope of the invention as claimed.

Having thus described my invention what I claim as new is:—

In combination a truck mounted on wheels, a beam hingedly attached to the truck, a rod attached to the beam, and a plurality of eye bolts arranged on the truck in spaced relation to each other so as to be engaged by the rod for regulating the angle at which the beam is disposed in relation to the truck.

In testimony whereof I affix my signature in presence of two witnesses.

JAMES EDWARD PULLIAM.

Witnesses:
 RICHARD COOK,
 FLOYD L. ROSS.